United States Patent [19]

Hutchins et al.

[11] Patent Number: 5,418,217
[45] Date of Patent: * May 23, 1995

[54] COMPOSITION FOR SELECTIVELY REDUCING SUBTERRANEAN FORMATION PERMEABILITY

[75] Inventors: Richard D. Hutchins, Placentia; Hoai T. Dovan, Yorba Linda, both of Calif.

[73] Assignee: Union Oil Company of California, Los Angeles, Calif.

[*] Notice: The portion of the term of this patent subsequent to Jul. 6, 2010 has been disclaimed.

[21] Appl. No.: 10,554

[22] Filed: Jan. 28, 1993

Related U.S. Application Data

[60] Continuation-in-part of Ser. No. 868,300, Apr. 14, 1990, Pat. No. 5,225,090, which is a division of Ser. No. 676,261, Mar. 27, 1991, Pat. No. 5,125,456.

[51] Int. Cl.⁶ ............................................. E21B 43/16
[52] U.S. Cl. ..................................... 507/222; 507/903; 507/935; 523/130
[58] Field of Search ............... 523/130; 252/8.551, 252/8.554; 525/337, 362; 507/222, 903, 935

[56] References Cited

U.S. PATENT DOCUMENTS

| | | |
|---|---|---|
| 3,306,870 | 2/1967 | Eilers et al. |
| 3,744,566 | 7/1973 | Szabo et al. |
| 3,795,276 | 3/1974 | Eilers et al. |
| 3,868,328 | 2/1975 | Boothe et al. |
| 4,137,182 | 11/1979 | Golinkin |
| 4,413,680 | 11/1983 | Sandiford et al. |
| 4,484,631 | 11/1984 | Sherwood et al. |
| 4,683,949 | 8/1987 | Sydansk et al. |
| 4,767,550 | 8/1988 | Hanlon et al. |
| 4,788,228 | 11/1988 | Ryles |
| 4,845,134 | 7/1989 | Mumallah et al. |
| 4,964,467 | 10/1990 | Holtmyer et al. |
| 4,968,435 | 11/1990 | Neff et al. |
| 5,037,858 | 8/1991 | MacDonald |
| 5,124,405 | 6/1992 | Erickson |
| 5,152,906 | 10/1992 | Aften et al. |

FOREIGN PATENT DOCUMENTS

786345 11/1957 United Kingdom .

OTHER PUBLICATIONS

Avery et al., SPE 18201, "Field Evaluation of a New Gelant for Water Control in Production Wells" (1988).
Burkholder et al., "New Gel Suppresses Water Flow in Oil Wells", Oil & Gas Journal, (Sep. 21, 1987).
Pfizer, "FLOPERM Gels for Control of Water Production" (Fall, 1986).
FLOPERM 500, Product/Technical Update, Prepared for Union Science & Technology Division, Union Oil Company of California (Feb. 6, 1987).
Pfizer, FLOPERM 500A MSDS, pp. 1-4 (Oct. 9, 1986).
Pfizer, "Material Safety Data Sheet", FLOPERM 500P.
Pfizer, "Material Safety Data Sheet", FLOPERM 500X.
Pfizer, "Product Information", FLOPERM 500.
Pfizer, "FLOPERM 500 Laboratory Test Procedure".
Pfizer, "Product Information", FLOPERM TM Gelants for Profile Modification.
Liang et al., SPE/DOE 20211.
Seright, SPE 20127.

Primary Examiner—Gary Geist
Assistant Examiner—Joseph D. Anthony
Attorney, Agent, or Firm—Gregory F. Wirzbicki; Shlomo R. Frieman

[57] ABSTRACT

Visible gels are formed by mixing an inorganic cross-linking agent with a low viscosity aqueous solution having a low polyacrylamide concentration and devoid of polymers containing a vicinal diol pendant group. The visible gels are employed to reduce the water/hydrocarbon permeability ratio of subterranean formations.

12 Claims, No Drawings

COMPOSITION FOR SELECTIVELY REDUCING SUBTERRANEAN FORMATION PERMEABILITY

CROSS-REFERENCES TO RELATED APPLICATIONS

This application is a continuation-in-part of application Ser. No 07/868,300, filed Apr. 14, 1992, now U.S. Pat. No. 5,225,090, which is a division of application Ser. No. 07/676,261, filed Mar. 27, 1991, now U.S. Pat. No. 5,125,456, the foregoing documents being incorporated herein in their entireties by reference.

BACKGROUND

The present invention relates to (a) processes for making aqueous solutions that form a visible gel, (b) aqueous solutions capable of forming a visible gel, and (c) visible gels.

High water-oil ratios are a frequent production well problem. The most widely practiced production well gel technology for water control employs cation-crosslinked polyacrylamide gels. However, there are a number of problems that limit universal use of existing gel technologies. For example, gelation times with cation-crosslinked systems are often tricky to control. In addition, polymer or gel is often dislodged by and/or back-produced with reservoir fluids causing (a) problems with surface facilities and (b) limited longevity of the treatment response. Furthermore, the use of heavily crosslinked or highly concentrated gels that may limit back production often decrease oil production significantly by decreasing the permeability of the subterranean formation to oil.

In response to these problems, a low viscosity, water-based polyacrylamide system was developed that preferentially flows into those zones or portions of the subterranean formation having a higher water saturation. The system employs an organic crosslinking agent that creates a covalently bonded gel structure. At polymer concentrations below 4,000 ppm, visible gels—as opposed to microgels—are not obtained. Even at polymer concentrations as high as 5,000 ppm, it is very difficult, if not impossible, to form visible gels with this system.

Unfortunately, microgels, in comparison to visible gels, tend to reduce water permeability less and exhibit a shorter longevity.

SUMMARY OF THE INVENTION

The present invention provides a water-based, low viscosity polyacrylamide solution that forms visible gels and preferentially flows into higher water saturation zones. As used in the specification and claims, the term "polyacrylamide" means a polymer containing acrylamide and/or modified acrylamide (e.g., methacrylamide, ethylacrylamide) polymerized monomers, the combined weight percents of the polymerized acrylamide and/or modified acrylamide monomers constituting at least about 50 weight percent of the total monomeric content of the polymer. Exemplary polyacrylamides include, but are not limited to, polyacrylamide homopolymers, copolymers containing acrylamide, homopolymers of modified acrylamide monomers, and copolymers containing modified acrylamide monomers. The monomers copolymerized with acrylamide or modified acrylamide monomers are preferably hydrophilic monomers such as acrylic acid and methacrylic acid.

The aqueous solution comprises an inorganic crosslinking agent and a polyacrylamide polymer. The polyacrylamide polymer is present in the solution in a concentration of less than about 20,000 ppm by weight based upon the total weight of the aqueous solution.

In one embodiment of the invention, the visible gel is formed by mixing the inorganic crosslinking agent with the aqueous polyacrylamide solution. In another embodiment, the visible gel is formed by contacting the polyacrylamide-containing solution with a stainless steel object, e.g., passing the polyacrylamide-containing aqueous solution through a stainless steel conduit.

The invention also encompasses a process for selectively reducing the water permeability of a hydrocarbon-containing subterranean formation and a recovery system. In one version of the invention, the selective water permeability reduction process entails forming the inorganic crosslinking agent-containing aqueous polyacrylamide polymer solution and injecting this aqueous solution into at least a portion of the subterranean formation. In another version, the aqueous polyacrylamide solution is contacted with a stainless steel object, e.g., a stainless steel mixing tank, and then injected into at least a portion of the subterranean formation.

The recovery system comprises a subterranean formation, a well penetrating at least a portion of the subterranean formation, and either the inorganic crosslinking agent-containing aqueous polyacrylamide polymer solution located within at least a portion of the interior bore of the well or the visible gel located in at least a portion of the subterranean formation.

DETAILED DESCRIPTION OF THE INVENTION

One aspect of the present invention is directed to forming visible gels from an aqueous polyacrylamide solution having (a) a low viscosity and (b) a low polyacrylamide concentration. The viscosity of a visible gel is higher than the viscosity of the aqueous polyacrylamide solution from which it is prepared. In contrast, the viscosity of a solution containing a nonvisible gel or microgel is less than the viscosity of the aqueous polyacrylamide solution from which the nonvisible gel is prepared.

For the purpose of the specification and claims, the viscosity of the aqueous polyacrylamide solution is low if a two weight percent potassium chloride (KCl) solution having the same polyacrylamide concentration as present in the aqueous polyacrylamide solution has a viscosity of less than about 30 centipoise (cp) when measured at about 70° F. and at a rotational speed of about 6 rpm with a Brookfield viscometer fitted with an ultra low (UL) adapter. Preferably, the viscosity of the KCl solution is less than about 25, more preferably less than about 20, and most preferably less than about 15. Generally, the viscosity of the KCl solution is at least about 1 and preferably at least about 3 cp. A very preferred viscosity range of the KCl solution is within the range of about 3 to about 15 cp.

In addition, the polyacrylamide concentration of the aqueous polyacrylamide solution is generally less than about 20,000 ppm by weight. As used in the specification and claims, the ppm by weight of the polyacrylamide is based upon the weight of the polyacrylamide present in the aqueous polyacrylamide solution divided by the total weight of all constituents composing the aqueous polyacrylamide solution. More typically, the aqueous polyacrylamide solution contains less than about 15,000, preferably less than about 10,000, more preferably less than about 5,000, and most preferably less than about 4,000 ppm by weight polyacrylamide. Usually, the aqueous polyacrylamide solution comprises at least about 1,000, preferably at least about 1,500, more preferably at least about 2,000, even more preferably at least about 2,500, and most preferably at least about 3,000, ppm by weight polyacrylamide.

Usually, the viscosity average molecular weight of the polyacrylamide is less than about 10,000,000, preferably less than about 7,000,000, and more preferably less than about 5,000,000. In the majority of cases, the polyacrylamide has a viscosity average molecular weight of at least about 1,000,000.

A relationship exists between the minimum desired polyacrylamide concentration, the preferred polyacrylamide concentration, and the viscosity average molecular weight of the polyacrylamide employed in the aqueous solution. In general, the concentration of polyacrylamide required to form a visible gel increases with decreasing molecular weight. This relationship is illustrated for polyacrylamides of various viscosity average molecular weights in the following Table A.

TABLE A

| Viscosity Average Molecular Weight | Minimum Desired Polyacrylamide Concentration, ppm by weight | Preferred Polyacrylamide Concentration, ppm by weight |
| --- | --- | --- |
| 10,000,000 | 1,000 | 3,000–5,000 |
| 3,000,000 | 1,500 | 4,000–7,000 |
| 1,000,000 | 4,000 | 10,000–15,000 |
| <600,000 | 10,000 | 15,000–40,000 |

The polyacrylamide is preferably cationic, having a cationic charge density preferably less than about 40 weight percent. More preferably, the cationic charge density of the polyacrylamide is less than about 35 weight percent and, most preferably, about 25 to about 35 weight percent. Cationic polyacrylamides are generally nonionic polyacrylamides containing a cationic comonomer (such as an alkylene polyamine, e.g., dimethylaminopropylamine), a quaternary ammonium chloride (such as trimethyl octyl ammonium chloride, trimethyl stearyl ammonium chloride, trimethyl ammonium chloride, oleyl ammonium chloride), or an amine hydrochloride (oleyl amine diethylamine hydrochloride).

The polyacrylamide employed in the present invention is preferably substantially devoid, and more preferably totally devoid, of pendant vicinal diol groups. In addition, it is also preferred that the polyacrylamide be substantially devoid, and more preferably totally devoid, of pendant aromatic polyols having at least two hydroxyl groups located on adjacent carbon atoms. Furthermore, the polyacrylamide is preferably substantially devoid, and more preferably totally devoid, of any pendant group having at least two hydroxyl groups located on adjacent carbon atoms. Also, any non-polyacrylamide polymer employed in conjunction with a polyacrylamide polymer to prepare the visible gel of the present invention is likewise preferably substantially devoid, and more preferably totally devoid, of vicinal diols attached to either (a) the backbone of the polymer or (b) a pendant group attached to the polymer backbone.

In one version of the invention, the visible gel is prepared by mixing the aqueous polyacrylamide solution with an inorganic crosslinking agent. Typical inorganic crosslinking agents are boron, stainless steel, polyvalent metals, chelated polyvalent metals, and compounds capable of yielding polyvalent metals. Some of the more common polyvalent metal, inorganic crosslinking agents include cobalt salts, chromium salts, aluminum salts, aluminates, molybdates, gallates, dichromates, titanium chelates, aluminum citrate, chromium citrate, chromium acetate, and chromium propionate. A readily available source of boron is boric acid, and exemplary stainless steel grades are 304 and 316 grade stainless steel. Preferably, the active portion of the inorganic crosslinking agent is selected from the group consisting of boron, chromium, aluminum, cobalt, molybdenum, stainless steel, and mixtures thereof.

Generally, less than about 200 ppm by weight of the inorganic crosslinking agent is mixed with the aqueous polyacrylamide solution. As used in the specification and claims, the ppm by weight of the inorganic crosslinking agent is based upon the weight of the active moiety of the inorganic crosslinking agent added to the aqueous polyacrylamide solution divided by the total weight of all constituents composing the aqueous polyacrylamide solution (including the entire weight of the inorganic crosslinking agent). In all cases (except for boron and stainless steel), the active moiety of the inorganic crosslinking agent is the elemental polyvalent metal, e.g., chromium, aluminum, cobalt, or molybdenum. In the case of boron and stainless steel, the active moiety is boron and stainless steel, respectively. Preferably, less than 100, more preferably about 10 to about 100, and most preferably about 25 to about 75 ppm by weight of inorganic crosslinking agent is mixed with the aqueous polyacrylamide solution.

Optionally, an organic crosslinking agent is also employed in making the visible gel. The organic crosslinking is mixed with the aqueous polyacrylamide solution before, after, or simultaneously during the mixing of the aqueous polyacrylamide solution and the inorganic crosslinking agent. Exemplary organic crosslinking agents include, but are not limited to, aldehydes, dialdehydes, phenols, substituted phenols, and ethers. Phenol, resorcinol, glutaraldehyde, catechol, formaldehyde, and divinylether are some of the more typical organic crosslinking agents.

Typically, less than about 2,000 ppm by weight of organic crosslinking agent is mixed with the aqueous polyacrylamide solution. As used in the specification and claims, the ppm by weight of the organic crosslinking agent is based upon the weight of the organic crosslinking agent added to the aqueous polyacrylamide solution divided by the total weight of all constituents composing the aqueous polyacrylamide solution. It is preferred to employ less than 1,000, and more preferably about 200 to about 800, ppm by weight organic crosslinking agent in formulating the visible gel of the present invention.

In another version of the invention, the visible gel is made by passing the aqueous polyacrylamide solution through a stainless steel conduit. Alternatively, the aqueous polyacrylamide solution is mixed in a stainless steel vessel or with a stainless steel object (e.g., a stainless steel stirrer). The mean residence or contact time of the aqueous polyacrylamide solution with the stainless steel object necessary to form a visible gel depends upon the temperature of the solution and the ratio of the surface area of the stainless steel in contact with the aqueous solution to the volume of the aqueous solution.

In general, the higher the temperature of the solution, the shorter the required mean residence time, and the higher the ratio the shorter the required mean residence time.

The inorganic and organic crosslinking agents are optionally introduced into the aqueous polyacrylamide polymer solution before, during, or after the solution contacts the stainless steel conduit, mixing tank, or object. The type and amounts of inorganic and organic crosslinking agents employed in this version are the same as discussed in the previously described version of the invention.

The gelation time of the aqueous polyacrylamide solution is controlled by the pH and temperature of the solution. In general, the higher the temperature of the solution, the shorter the gelation time. A higher solution pH also yields a shorter gelation time. The pH of the solution is adjusted by the addition thereto of a base (e.g., a sodium hydroxide solution) or an acid (e.g., an acetic acid solution). Preferably, the pH of the solution is about 5 to about 8, and more preferably is about 6 to about 7.5.

One exemplary process for practicing the present invention is as follows. Before mixing any chemicals into the water employed in making the aqueous polyacrylamide solution, the water is generally filtered to prevent any suspended solids from damaging the formation by plugging the wellbore. Typically, the first chemicals added to the water are any required salts such as potassium or calcium chloride. Salts are generally employed to prevent clay problems in the formation and/or to help stabilize the gel.

In order for the polymer to experience a high degree of turbulence during the initial mixing stage, solid- and liquid-based polyacrylamide polymers are usually added to the water through an eductor or a positive displacement pump, respectively. The polyacrylamide polymer and water are typically mixed in a mixing tank in small 10 to 25 barrel batches. When desired, further mixing is achieved using either centrifugal pumps or other forms of agitation.

Once the polymer is completely mixed into the water, a base (e.g., an aqueous sodium hydroxide solution) or an acid (e.g., an acetic acid solution), if employed, is then added to the polymer solution to adjust the pH of the solution.

The crosslinking agent(s) are usually the final ingredients added to the mixing tank. When used in a solid form, the crosslinking agent is commonly first dissolved in water in order for it to more readily mix with the contents of the mixing tank. In situations where the solution is mixed in a stainless steel tank, the addition of crosslinking agents to the contents of the mixing tank is optional because the stainless steel tank itself acts as a crosslinking agent.

The aqueous polyacrylamide solution is obtained when all the desired ingredients have been mixed in the mixing tank. The resulting aqueous solution is then often injected into a subterranean formation through the interior bore of a production well at a pressure below the fracture pressure of the formation. The well penetrates at least a portion of the formation. Depending on formation properties, such as porosity, thickness, and permeability, the volume of the aqueous solution injected into the well usually varies from about 100 to about 3,000 barrels. More typically, the volume of the injected solution ranges from about 400 to about 1,500 barrels. The aqueous solution is displaced from the interior of the well bore by water. When treating a clay sensitive formation, it is preferred to displace the aqueous solution using a solution containing at least about 2 weight percent KCl.

The aqueous polyacrylamide solution is displaced into the formation a sufficient distance so that at least a portion of the pore space in the formation, usually at least about 3 feet from the production well or point of injection, is occupied by the solution. Preferably, the aqueous solution occupies at least a portion of the pore space located at least about 15 feet from the well. More preferably, at least some of the pore space located at least about 20 feet from the production well contains the solution.

The well is then shut in for a sufficient period of time to allow the aqueous polyacrylamide solution within the pore space of the subterranean formation to form a visible gel. The well is then slowly put back on production following the shut in period.

The aqueous polyacrylamide solution of the present invention is preferably used to treat subterranean formations having a temperature less than about 200° F. More preferably, the formation to be treated has a temperature less than about 175° F., and most preferably less than about 150° F.

EXAMPLES

The following examples, which are intended to illustrate and not limit the invention, describe procedures for forming visible gels from various aqueous solutions having a low viscosity and low polyacrylamide content.

Examples 1–21

The following procedure was used in each of Examples 1–21. Aqueous polyacrylamide solutions were prepared using polymers supplied in either a solid or premixed solution form. For a polymer supplied in solid form, the polymer was added with stirring over a period of about 20 seconds to an aqueous KCl solution (about 2 weight percent KCl) to obtain an aqueous polyacrylamide solution having a polyacrylamide concentration of about 5,000 ppm by weight. Initially, the solution was stirred at about 600 rpm. After the 20 second addition period, the stirring speed was reduced to about 200 rpm. Stirring continued for about 3 hours or until the polymer had dissolved. When desired, the 5,000 ppm polyacrylamide-containing aqueous solution was diluted to a lower concentration by adding an additional amount of the aqueous 2% KCl solution followed by gentle stirring until the resulting solution was well mixed.

For a polymer supplied as a premixed solution, a dilution with the aqueous 2 weight percent KCl solution was made to obtain the 5000 ppm polyacrylamide-containing aqueous solution. Generally, the latter polyacrylamide-containing solution exhibited a pH of about 4.7 and was adjusted to about 7.5 using a NaOH solution (about 1N).

Stock solutions of various crosslinking agents were prepared by adding the crosslinking agents indicated below in Table I to deionized water. Sufficient deionized water was used so that each aqueous crosslinking agent-containing stock solution weighed about 2 g.

TABLE I

| | |
|---|---|
| 1. Chromium (Cr): | Add 0.230 g $CR(NO_3)_3 \cdot 9H_2O$ |
| 2. Aluminum (Al): | Add 0.370 g $Al_2(SO_4)_3 18H_2O$ |
| 3. Boron (B): | Add 0.171 g $H_3BO_3$ |

TABLE I-continued

| | |
|---|---|
| 4. Cobalt (Co): | Add 0.148 g Co(NO$_3$)$_2$.6H$_2$O |
| 5. Molybdenum (Mo): | Add 0.055 g (NH$_4$)$_6$Mo$_7$O$_{24}$.4H$_2$O |

Using a syringe, 15 ml of a polymer solution were transferred to a glass ampoule. Using a micropipette, an amount of an organic crosslinking agent solution, when employed, and an amount of an inorganic crosslinking agent solution, when employed, were then sequentially added to the ampoule to achieve the crosslinking agent concentrations shown below in Table III. For Examples 20–21, 1 g of stainless steel drill cuttings was added to the ampoule. The ampoule was capped, shaken, and then stored in an oven at about 115° F. The ampoule was periodically removed from the oven to determine whether a visual gel had formed. The contents of the ampoule were visually rated according to the Gel Rating Key set forth in the following Table II.

TABLE II

Gel Rating Key

5 Rigid Gel
4 Elastic Gel
3 Weak Gel
2 Viscous Fluid
1 Water-like Fluid

Examples 22–23

About 16,667 g of a FLOPERM 500P brand cationic polyacrylamide solution (available from Pfizer; containing about 3 weight percent polymer) was added to a tared 250 ml beaker. An aqueous KCl solution (about 75 g containing about 2 weight percent KCl) was then added to the beaker. The pH of the solution in the beaker was next adjusted with FLOPERM 500A brand acetic acid solution (containing about 50 weight percent acetic acid) to about 7.5 while stirring the solution slowly with a teflon-coated, magnetic stir bar. An additional aliquot of the 2 weight percent aqueous KCl solution was afterwards added to bring the total weight of the contents of the beaker to about 99.82 g. About 0.180 g of FLOPERM 500X (available from Pfizer as an aqueous solution containing about 40 weight percent formaldehyde) was added to the contents of the beaker and, after the addition of FLOPERM 500X, stirring was continued for about 5 minutes. This procedure yielded a final solution containing about 5000 ppm of polymer and about 1800 ppm of FLOPERM 500X (or about 720 ppm of formaldehyde).

In Example 22, an aliquot (about 50 ml) of the final solution was placed inside a stainless steel (304 grade) pressure bomb. Another aliquot of the final solution was transferred to a glass ampoule in the control experiment of Example 23. The contents of the glass ampoule were periodically visually rated using the Gel Rating Key of Table II, supra, and the results are set forth in the following Table IV. A sample from the pressure bomb was

TABLE III

| | Polymer, ppm | Crosslinking Agents | | Gel Rating | | | | | |
|---|---|---|---|---|---|---|---|---|---|
| | | Organic | Inorganic | Days | Weeks | | | | |
| Ex. | by wt. | ppm by wt | ppm by wt | 1 | 1 | 2 | 3 | 4 | 6 |
| 1 | AC 2335[a]/5,000[b] | 0 | Cr/40[c] | 2– | 3 | ND[j] | ND | ND | ND |
| 2 | " | Fd/720[e] | Cr/40 | 3– | 5 | ND | ND | ND | ND |
| 3 | " | " | B/40 | 3– | 4 | ND | ND | ND | ND |
| 4 | " | " | Co/40 | 3– | 4– | ND | ND | ND | ND |
| 5 | " | " | Cr/100 | 3 | 4– | ND | ND | ND | ND |
| 6 | " | " | B/100 | 3+ | 4– | ND | ND | ND | ND |
| 7 | " | " | CO/100 | 3+ | 3+ | ND | ND | ND | ND |
| 8 | " | " | MO/100 | 1 | 2+ | ND | ND | ND | ND |
| 9 | " | F/1800 | Cr/100 | 2+ | 4– | ND | ND | ND | ND |
| 10 | " | " | B/100 | 3– | 5– | ND | ND | ND | ND |
| 11 | " | " | CO/100 | 3– | 4+ | ND | ND | ND | ND |
| 12 | " | " | Al/100 | 2+ | 3– | ND | ND | ND | ND |
| 13 | T 260[f]/1,500 | 0 | Cr/40 | 4– | ND | ND | ND | ND | ND |
| 14 | " | " | Al/40 | 4– | 4– | ND | ND | ND | ND |
| 15 | " | F/720 | Cr/40 | 2+ | 4– | ND | ND | ND | ND |
| 16 | " | " | Al/40 | 3+ | 4+ | ND | ND | ND | ND |
| 17 | F 500[g]/5,000 | F/720 | Cr/40 | 3– | 3– | 4 | 4 | 4 | 4 |
| 18 | " | " | Al/40 | 1– | 1– | 2– | 2– | 2– | 2– |
| 19 | " | " | B/40 | 1+ | 2+ | 4 | 4 | 4 | 4 |
| 20 | " | " | SS[h] | 3– | 3 | 4 | 4+ | 4+ | 4+ |
| 21 | " | " | SS[i] | 3+ | 4+ | 4+ | 4+ | 4+ | 4+ |

[a]AC 2335 is a Allied Colloids, Inc. brand cationic polyacrylamide polymer having about a 30 weight percent cationic content. A 2 weight percent KCl solution containing about 5,000 ppm by weight AC 2335 has a viscosity of about 25 cp.
[b]The numerator denotes the polymer and the denominator denotes the ppm by weight content of the polymer in the aqueous solution tested.
[c]The numerator denotes the inorganic crosslinking agent and the denominator denotes the ppm by weight content of the inorganic crosslinking agent in the aqueous solution tested.
[d]F denotes FLOPERM 500X brand formaldehyde crosslinking agent.
[e]The numerator denotes the organic crosslinking agent and the denominator denotes the ppm by weight content of the organic crosslinking agent in the aqueous solution tested.
[f]T 260 is a Tiorco Inc. brand cationic polyacrylamide polymer having about a 30 weight percent cationic content and a viscosity average molecular weight of about 6,000,000. A 2 weight percent KCl solution containing about 1,500 ppm by weight T 260 has a viscosity of about 6 cp.
[g]F 500 is a Pfizer FLOPERM 500 brand cationic polyacrylamide polymer having about a 30 weight percent cationic content and a viscosity average molecular weight of less than about 10,000,000. A 2 weight percent KCl solution containing about 5,000 ppm by weight FLOPERM 500 has a viscosity of about 25 cp.
[h]SS denotes 316 grade stainless steel.
[i]SS denotes 304 grade stainless steel.
[j]ND denotes not determined.

The data set forth above in Table III indicate that visible gels are obtainable in accordance with the present invention using aqueous polyacrylamide solutions having a low viscosity and a low polymer content.

periodically obtained by injecting nitrogen into the top of the bomb to displace a portion of the bomb contents from the bottom of the pressure bomb. These samples were also visually rated using the Gel Rating Key and the results are listed in Table IV.

TABLE IV

| | Visual Gel Rating | | | | | |
| | Days | | | | | |
| Ex. | 0 | 2 | 6 | 9 | 13 | Comments |
| --- | --- | --- | --- | --- | --- | --- |
| 22 | 1++ | 4− | 3+ | 4 | 4+ | Clear Gel |
| 23 | 1+ | 1+ | 1+ | 1+ | 1+ | Clear Solution |

The data contained in Table IV shows that stainless steel helps a low viscosity, low polymer content aqueous polyacrylamide solution form a visible gel.

Although the present invention has been described in considerable detail with reference to some preferred versions, other versions are possible. For example, the composition of the present invention is also useful for selectively reducing the subterranean permeability proximate an injection well. Furthermore, in addition to treating subterranean formations containing natural resources to selectively reduce the flow of an aqueous liquid with respect to that of a hydrocarbon liquid, the method of the invention is also applicable for remedially treating man-made formations, such as toxic landfills, to selectively reduce the flow of water or other aqueous liquids with respect to nonaqueous contaminants emanating from the toxic landfill. By reducing the effluent from the landfill to primarily the nonaqueous contaminants, a cost savings is potentially achievable because it is then necessary to collect and treat a smaller liquid volume. In addition, the present invention is suitable for use in treating both fractured and unfractured formations. Therefore, the spirit and scope of the appended claims should not necessarily be limited to the description of the preferred versions contained herein.

What is claimed is:

1. A visible gel prepared by the step of contacting stainless steel with an aqueous solution comprising at least some cationic polyacrylamide, the concentration of the cationic polyacrylamide in the solution being less than about 4,000 ppm by weight, wherein (a) a 2 weight percent KCl solution having the same cationic polyacrylamide concentration has a viscosity of less than about 30 cp when measured at about 70° F. and at a rotational speed of about 6 rpm with a Brookfield LVT viscometer fitted with a UL adapter and (b) all the polymers employed in forming the gel are substantially devoid of a vicinal diol.

2. The gel of claim 1 wherein the aqueous solution has a cationic polyacrylamide concentration of about 1,000 to about 4,000 ppm by weight.

3. The gel of claim 1 wherein the 2 weight percent KCl solution having the same cationic polyacrylamide concentration has a viscosity of about 1 to less than about 25 cp when measured at about 70° F. and at a rotational speed of about 6 rpm with the Brookfield LVT viscometer fitted with the UL adapter.

4. The gel of claim 1 wherein the 2 weight percent KCl solution having the same cationic polyacrylamide concentration has a viscosity of about 1 to less than about 20 cp when measured at about 70° F. and at a rotational speed of about 6 rpm with the Brookfield LVT viscometer fitted with the UL adapter.

5. The gel of claim 1 wherein the 2 weight percent KCl solution having the same cationic polyacrylamide concentration has a viscosity of about 3 to about 15 cp when measured at about 70° F. and at a rotational speed of about 6 rpm with the Brookfield LVT viscometer fitted with the UL adapter.

6. The gel of claim 1 wherein the cationic polyacrylamide has a viscosity average molecular weight of less than about 10,000,000.

7. The gel of claim 1 wherein the cationic polyacrylamide has a viscosity average molecular weight of about 1,000,000 to about 10,000,000.

8. The gel of claim 1 wherein the cationic polyacrylamide has a cationic charge density of less than about 40 weight percent.

9. The gel of claim 1 wherein the cationic polyacrylamide has a cationic charge density of about 25 to about 35 weight percent.

10. The gel of claim 1 wherein all the polymers employed in forming the gel are totally devoid of a vicinal diol.

11. The gel of claim 1 wherein the contacting step further includes the step of mixing an organic crosslinking agent with the aqueous cationic polyacrylamide-containing solution.

12. The gel of claim 11 wherein the organic crosslinking agent is selected from the group consisting of aldehydes, dialdehydes, phenols, substituted phenols, ethers, and mixtures thereof.

* * * * *